(12) United States Patent
Chen

(10) Patent No.: US 6,192,806 B1
(45) Date of Patent: Feb. 27, 2001

(54) ANGLE ADJUSTABLE TABLE USED ON STEERING WHEEL

(76) Inventor: Zhong Yu Chen, 2018 Evans La., Appt. No. 4, San Jose, CA (US) 95125

( * ) Notice: Subject to any disclaimer, the term of this patent is extended or adjusted under 35 U.S.C. 154(b) by 0 days.

(21) Appl. No.: 09/405,962

(22) Filed: Sep. 27, 1999

(51) Int. Cl.⁷ ............................................. A47B 23/00
(52) U.S. Cl. ............................................................ 108/44
(58) Field of Search ................................. 108/44, 45, 1

(56) References Cited

U.S. PATENT DOCUMENTS

| | | |
|---|---|---|
| D. 319,357 | 8/1991 | Horne . |
| D. 335,226 | 5/1993 | Horne . |
| D. 374,203 | 10/1996 | Martinez . |
| 3,952,988 * | 4/1976 | Easterly ............................. 108/44 X |
| 4,749,161 | 6/1988 | Falcone . |
| 4,890,559 | 1/1990 | Martin . |
| 4,995,637 * | 2/1991 | Muraishi ............................. 108/44 X |
| 5,060,581 * | 10/1991 | Malinski ................................ 108/44 |
| 5,177,665 * | 1/1993 | Frank et al. ........................ 108/44 X |
| 5,386,785 * | 2/1995 | Naor ........................................ 108/44 |
| 5,413,035 | 5/1995 | Fernandez . |
| 5,487,521 | 1/1996 | Callahan . |
| 5,511,493 * | 4/1996 | Kanehl, Jr. ............................. 108/44 |
| 5,558,026 * | 9/1996 | Seibert .................................... 108/44 |
| 5,749,305 | 5/1998 | Jacovelli . |
| 5,749,306 | 5/1998 | Breuner . |

FOREIGN PATENT DOCUMENTS

| | | | |
|---|---|---|---|
| 885350 * | 11/1971 | (CA) ..................................... 108/44 |
| 1550899 * | 8/1979 | (GB) ..................................... 108/44 |

* cited by examiner

Primary Examiner—Jose V. Chen

(57) ABSTRACT

A foldable and surface angle adjustable table device mountable upon a steering wheel, the device including an arch shape support (3) with clamp(s) on it, and a flat table surface (1) pivotally connected to each other. A pair of table angle controls (9) is at the bottom of the table at each side. At each side of the support, there is a corresponding angle-adjusting wheel (11) with a flange plate (12) to change the angle of the table angle control, which in turn changes the angle of the table surface. This device can be easily mounted on and removed from a steering wheel by clamp, and can be folded into a compact unit for carrying or storage.

3 Claims, 6 Drawing Sheets

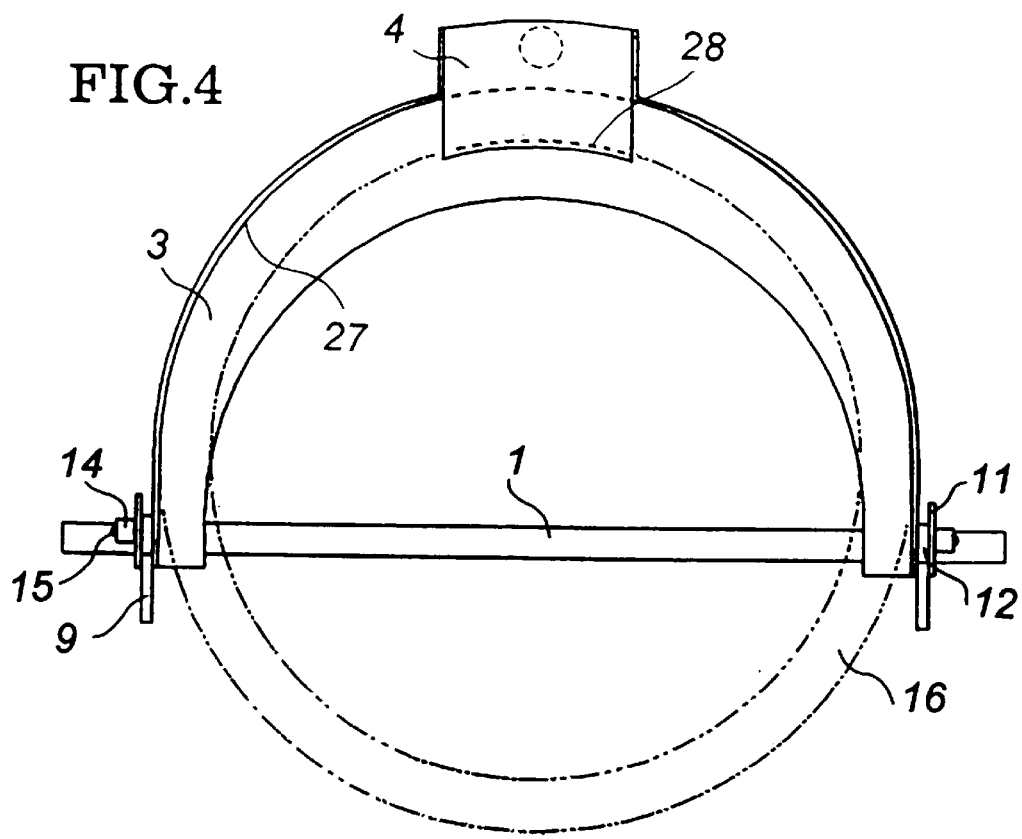
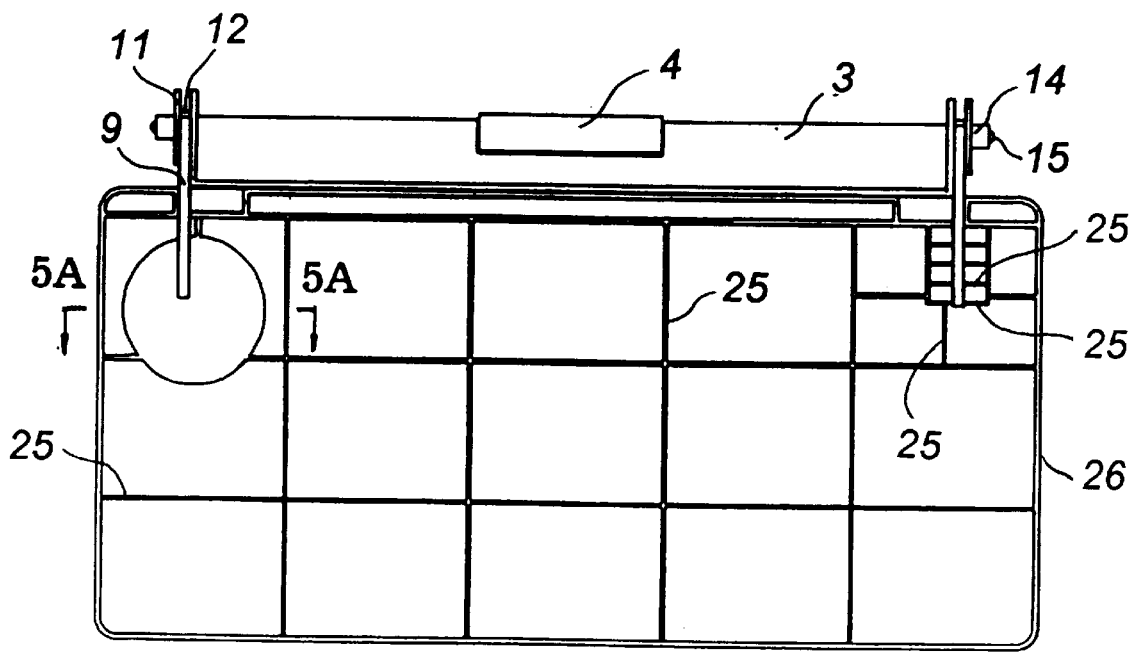

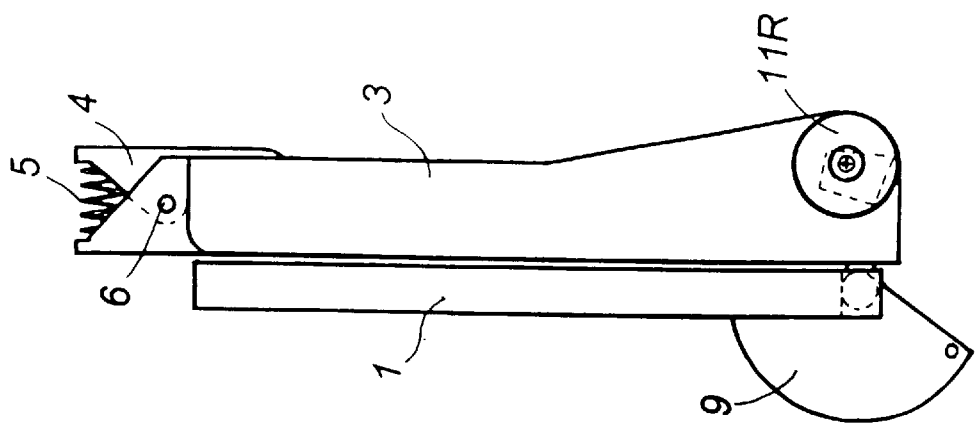
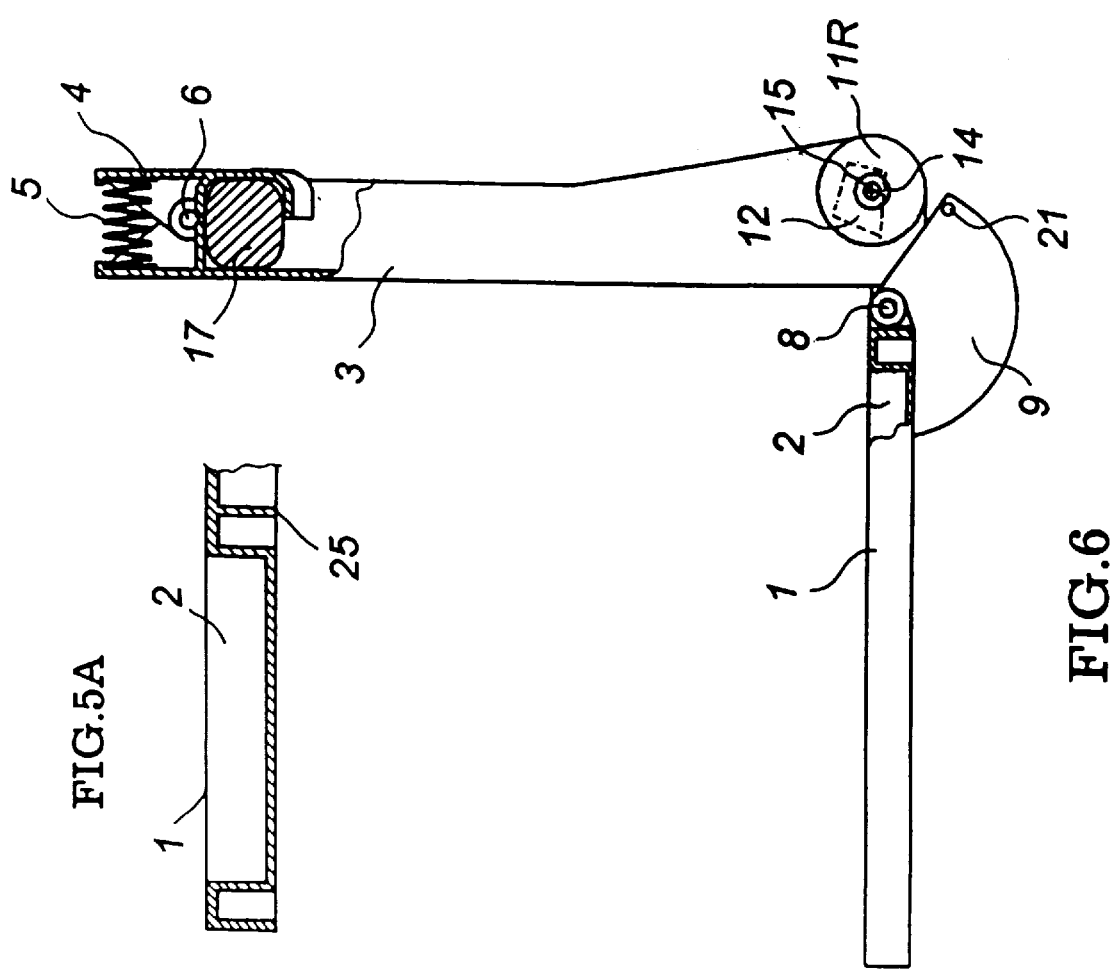

FIG.7
FIG.7A
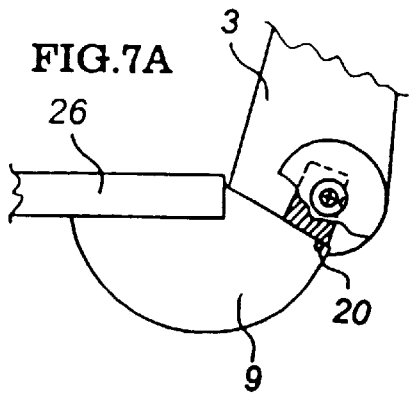
FIG.7B
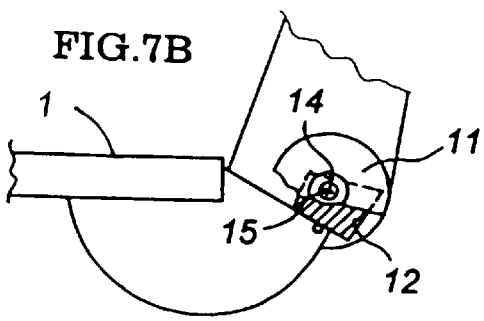
FIG.7C
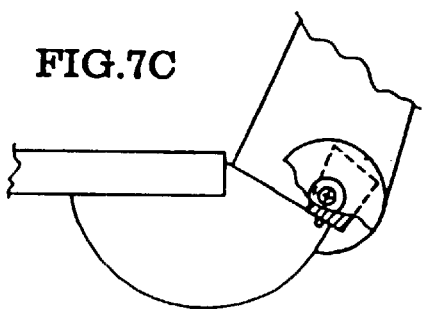
FIG.7D
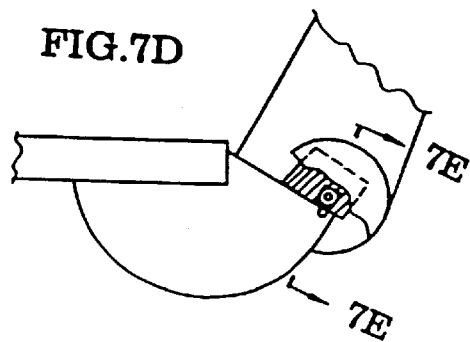
FIG.7F
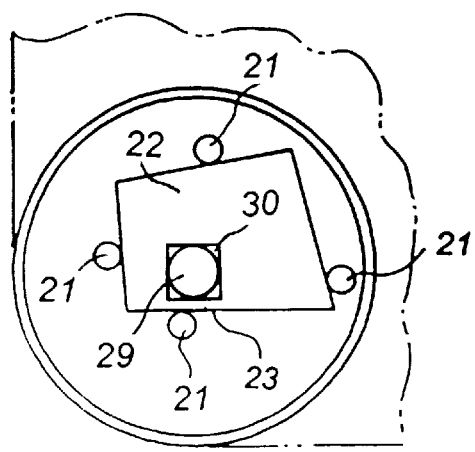
FIG.7E
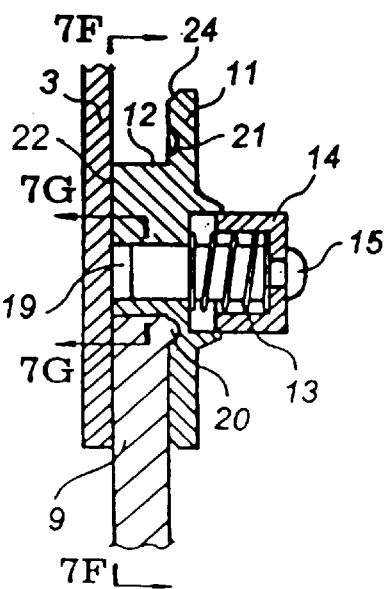
FIG.7G
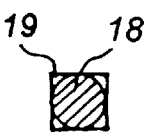

ANGLE ADJUSTABLE TABLE USED ON STEERING WHEEL

BACKGROUND

1. Field of Invention

This invention relates to a horizontally adjustable work surface, which can be easily and rigidly mounted on a steering wheel of almost any motor vehicles, for use by a person sitting behind the steering wheel for reading, writing, eating, using lap-top computer, and cosmetics, when the vehicle is in park position.

2. Description of Prior Art

It often happens to almost all drivers that they have no proper place to put food and drink when they prefer to sit in the driver's seat to eat meals. So, they place the food and drink in the passenger seat, change box, or even on top of the dashboard, which make their eating very uncomfortable and, some times, make a big mess in their vehicles. For ladies, they have no proper place to put their cosmetics when they would like to make-up in their vehicles. They have to hold the cosmetics in one hand and cannot make-up themselves as pretty as they are able to when they are sitting in front of a cosmetic table. When people want to read in a driver's seat, they have to hold the book in their hands no matter whether you like to do or not. When people want to write or use laptop computer in their cars, there is no flat surface for you to use.

Therefore, a number of devices have been created to provide solutions to solve such problems. However, none of these inventions are efficient enough to solve all the problems.

U.S. Pat. No. 5,749,306 to Breuner (1998) discloses a portable, steering wheel mounted computer table.

a) By design, the length of the table should be shorter than the width of a steering wheel. This means that the table surface area is limited, even hardly enough for a laptop computer.

b) This device is mounted on a steering wheel by a shock cord. This structure is not practical and rigid. The table will not be in balance, especially when there is an air bag bump on the steering wheel.

c) It does not posses a neat and uniform appearance and looks unstable by using a shock cord or similar material when placing an expensive and heavy laptop computer on it.

d) This device has nothing to prevent stop a force from under the table surface, which may knock the table off the steering wheel and damage the expensive computer.

e) This device cannot adjust the angle between the surface and the support. It needs to adjust a steering wheel in order to make the table surface in a suitable flat position, which often is quite difficult since the adjustment of a steering wheel is also limited, not to mention that many motor vehicles have steering wheels that cannot be adjusted.

f) This device is not strong enough to support a laptop computer that has certain weight. The two support designs of this device disclose that the pivot is too close to the end of the notch in the control channel, which requires to construct the control channel and support with very heavy materials in order to provide adequate rigidity for lap-top computer. That will greatly increase the weight and cost of the device.

g) This device comprises to have control channel at each side. This makes the already limited table space even smaller. Therefore, this feature complicates or eliminates access to the floppy or CD drive on many laptop computers where the drive is located on the rare half of the side of the computer.

U.S. Pat. No. 5,749,305 to Jacovelli (1998) discloses a tray for use in automobiles for placing food, drink or others.

h) By design, this device looks not stable enough on a steering wheel and the two end of the tray may go up and down like a seesaw.

U.S. Pat. No. 5,487,521 to Callahan (1996) discloses a table device mounted on a steering wheel for computer, printed matter, food and/or beverage.

i) By design, the table surface is inserted into a slot in the support board. This device should be made of very heavy material to achieve the required function to support the weight of a laptop computer.

j) The support board is solid and flat. This board may not be placed very flat and stable on a steering wheel that is equipped with an air bag.

U.S. Pat. No. 4,890,559 to Martin (1990) discloses a steering wheel table.

k) This device is mounted on a steering wheel. The surface of the table can be horizontally adjusted. However, when the surface of the table is adjusted in a horizontally flat position, the surface is above the top line of the steering wheel. This almost makes it impossible for a driver and any user to use it comfortably, because the table is too high.

U.S. Pat. No. Des. 335,226 to Horne (1993) discloses a steering wheel table.

l) This device only solves one problem i.e. a driver or user has a flat board to write on. This device is not a table, because the surface of the table is in a same angle position as a steering wheel. It is impossible to leave food, drink, printed matters or computer on it, unless a steering wheel is in a flat and horizontal position.

OBJECTS AND ADVANTAGES

Several objects and advantages of my invention include those that:

a) may be mounted by clamps on any car steering wheels fast and easily;

b) may be folded up for storage in any place inside the car;

c) has a rigid and stable structure design when mounted on a steering wheel and can take impact of forces from all direction;

d) has a wider table surface for more area without affecting the comfort of a user;

e) has a real flat table surface, no raised slip stop or other structures on the table surface or at the side of the table surface to affect writing or using a lap-top computer's CD or floppy drive when such drive is located at the side of the computer;

f) has special place for drink;

g) may adjust the table surface horizontally to a flat position when used on non-adjustable steering wheel;

h) may adjust the table surface horizontally to a flat position when used on adjustable steering wheel while adjusting the steering wheel alone is not enough to make the table in a flat position;

i) may sustain more heavy weight than all the other inventions, if manufactured with the same material, because the distance between pivot and angle control point is longer;

j) may not need heavy material to make;

k) may be manufactured by plastic casting structure, easy for large volume production;

DRAWING FIGURES

In the drawings, closely related figures have the same number but different alphabetic suffixes.

FIG. 4 shows a table in back side view.

FIG. 5 shows a table in bottom side view.

FIG. 5A shows a cup slot in a sectional view.

FIG. 6 shows a table in right side view and the association of various parts of a typical embodiment.

FIG. 2 through FIG. 6 shows the views when the support and table surface are in a position of 90 degree.

FIG. 6A shows a table in right side view in the closed position.

FIG. 7A through 7D shows 4 different angle positions of the support and table surface by turning angle-adjusting wheels.

FIG. 7E shows an angle-adjusting wheel in a sectional view.

FIG. 7F shows an angle-adjusting wheel in back side view.

Figure 1:
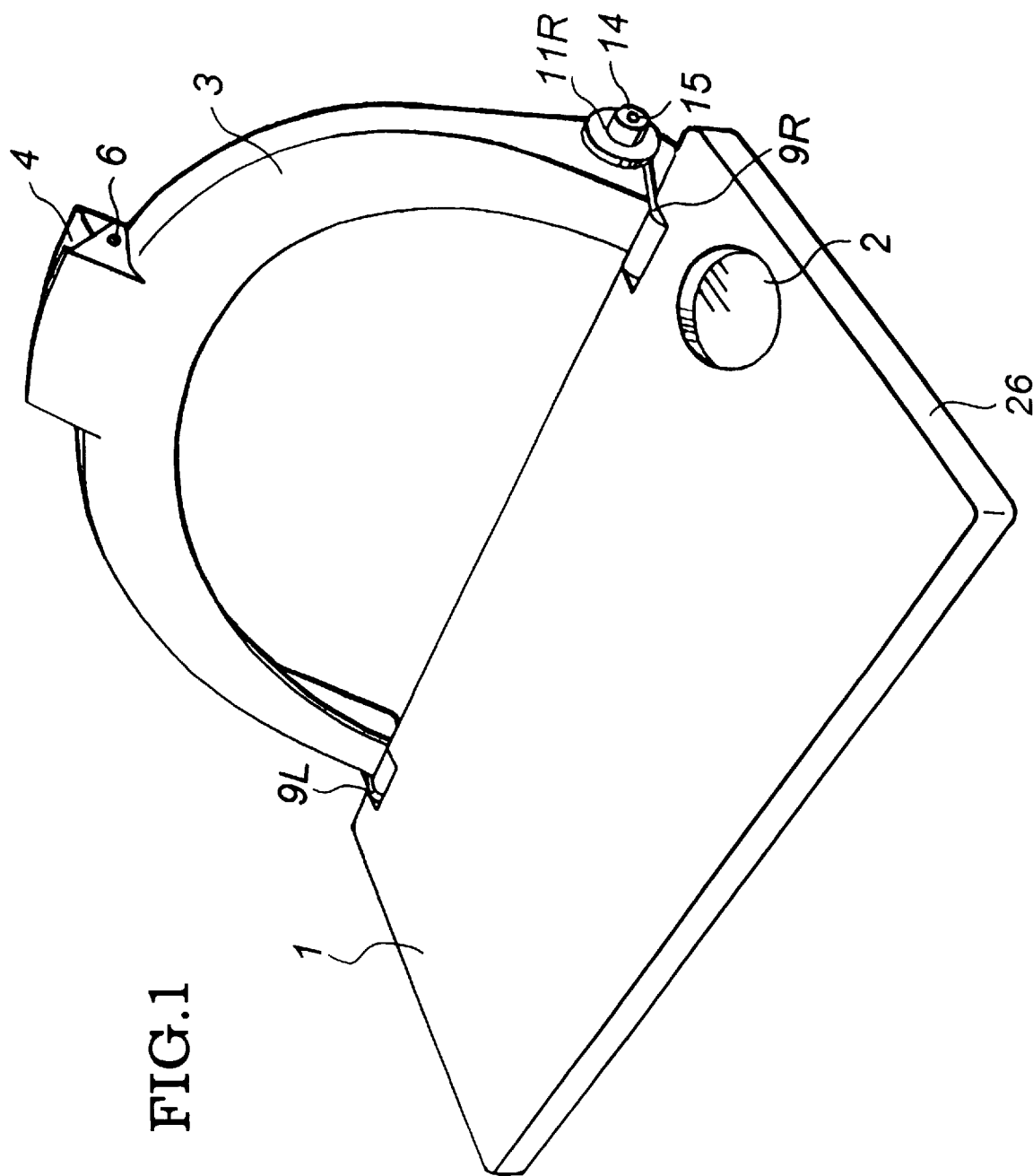
FIG. 1 shows a support table in perspective view assembled of the various parts of a typical embodiment.

FIG; 7G shows an angle adjusting wheel axle in a sectional view.

REFERENCE NUMBERS IN DRAWINGS 1. table surface
2. cup slot
3. support with front half clamp
4. back half clamp
5. clamp spring
6. clamp axle
7. table axle sleeve
8. table axle
9. table angle control
10. angle-adjusting wheel axle
11. angle-adjusting wheel
12. angle-control polygonal flange plate
13. angle-adjusting wheel spring
14. angle-adjusting wheel spring cover
15. angle-adjusting wheel screw
16. steering wheel
17. steering wheel in sectional view
18. angle-adjusting wheel axle in sectional view
19. angle-adjusting wheel axle's square end
20. flange point on a table angle control
21. recess holes in angle-adjusting wheel
22. surface of angle-control polygonal flange plate
23. side of angle-control polygonal flange plate
24. 45 degree chamfer angle on the inner edge of angle-adjusting wheel
25. reinforcing rib for table surface
26. side of table surface
27. inner sidewall
28. radian of inner side of a clamp
29. round hole on an angle-control polygonal flange plate
30. square hole on angle-control polygonal flange plate

DESCRIPTION—FIGS. 1 to 7

FIG. 1 illustrates a detailed embodiment of the present invention.

Figure 1A:
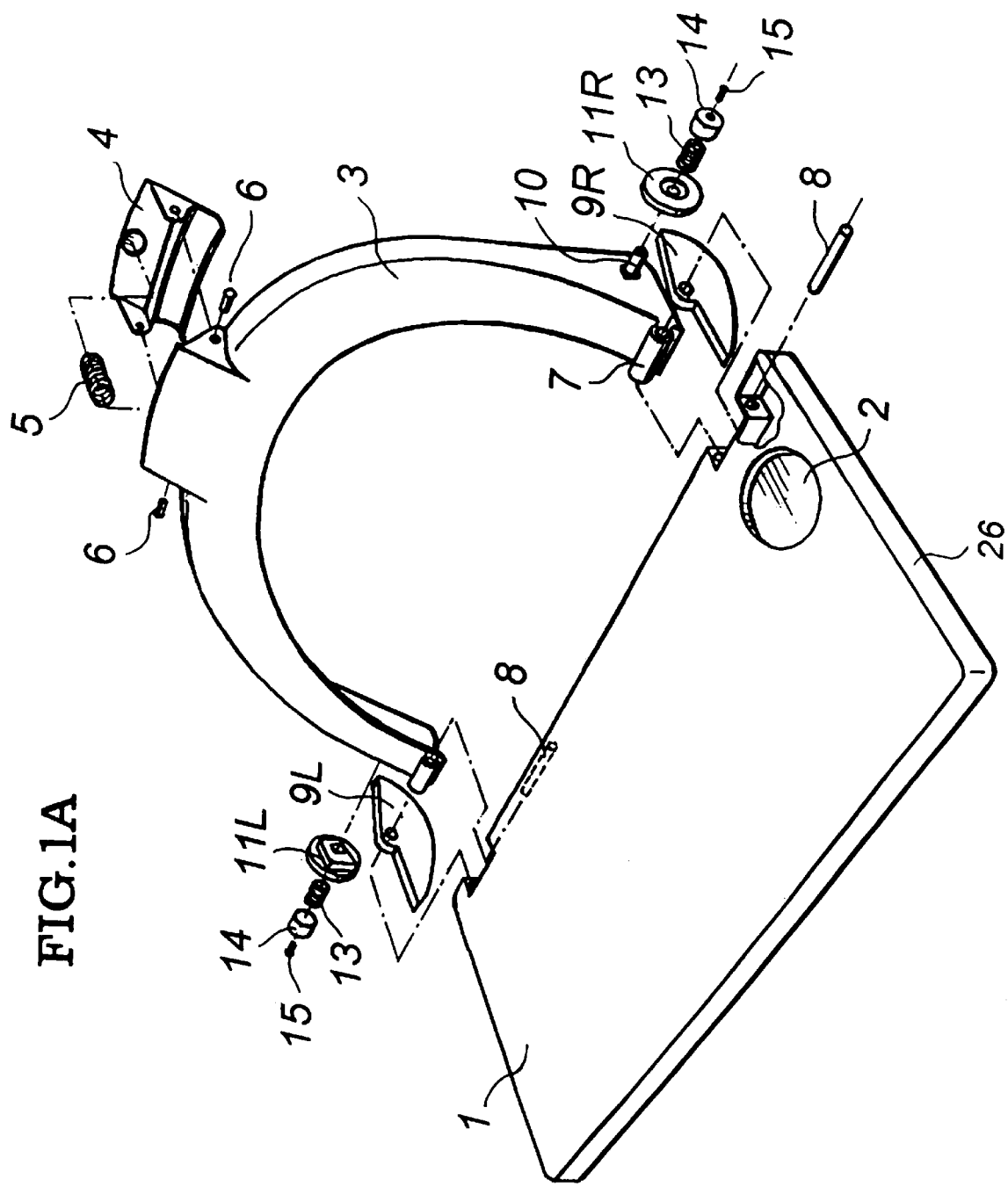
FIG. 1A shows a table in perspective exploded view and the association of various parts.

FIG. 1A and FIG. 5 show all parts of the present invention. Except springs and screws, this device can be constructed with plastic material, such as ABS, polystyrene, and polypropylene. The thickness of all walls of every part does not exceed 3 mm for big parts, and 1 to 1.5 mm for small parts. The thickness of the reinforcing ribs for the table will not exceed 1.5 mm. The table surface 1 comprises of a surface board, 4 sidewalls 26 and reinforcing ribs 25.

FIG. 2 through FIG. 6 shows the views when the support and table surface are in a position of 90 degree.

Figure 2:
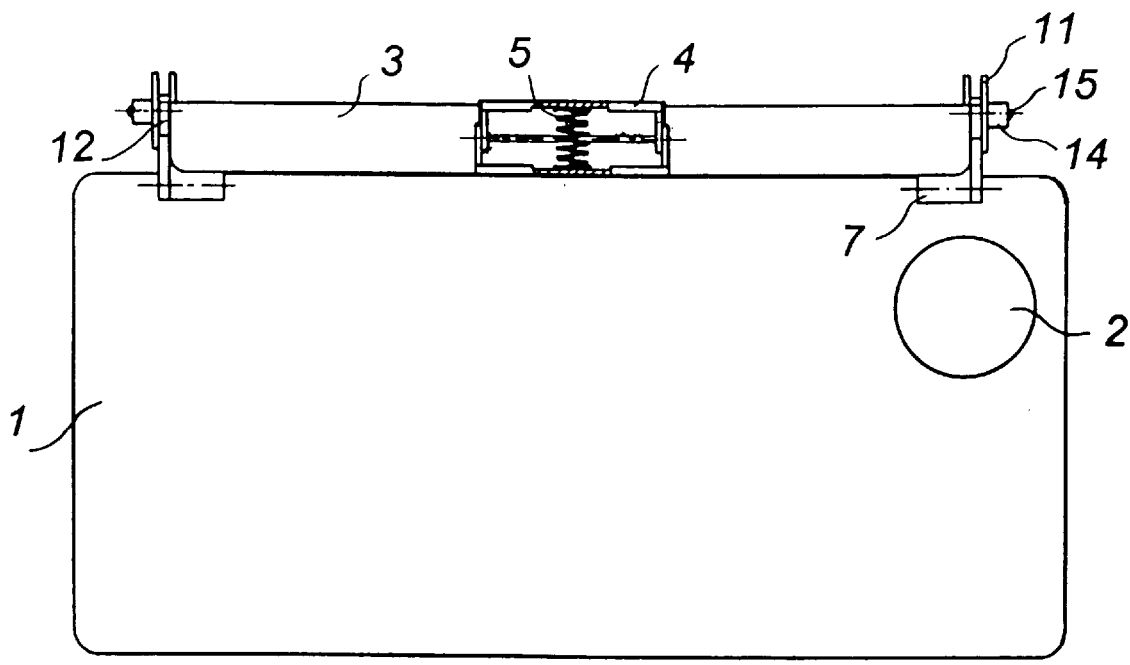
FIG. 2 shows a table in topside view assembled of the various parts.

FIG. 2 shows a table surface 1 wider than a steering wheel and a cup slot 2 position on the table surface 1.

Figure 3:
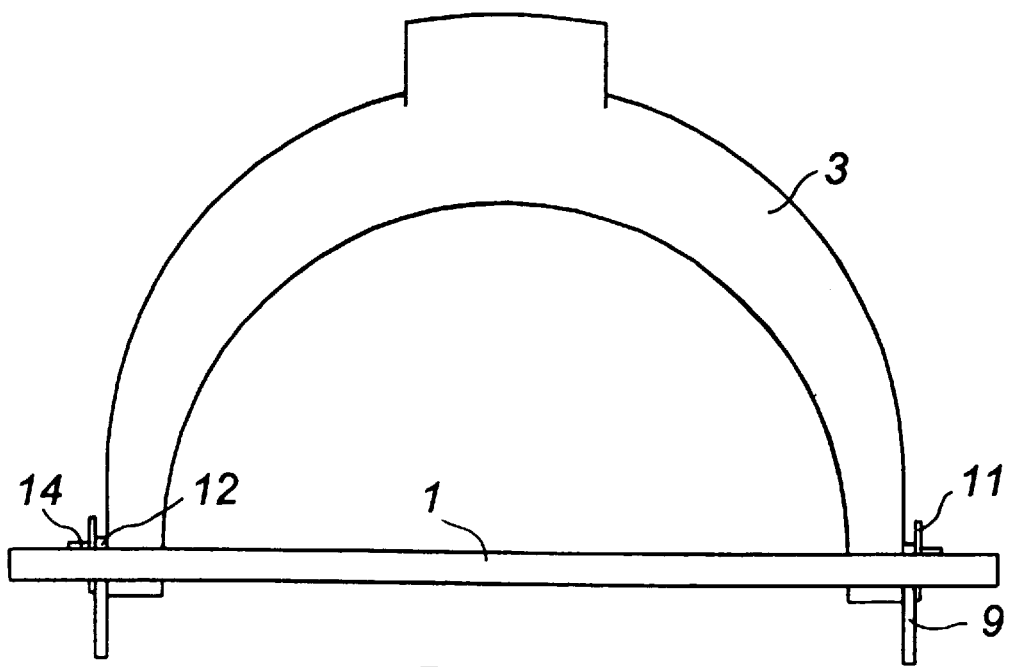
FIG. 3 shows a table in front side view.

FIG. 3 shows a front view of an arch shape support 3 with a clamp on it.

FIG. 4 shows that the radian of the inner sidewall 27 of the support is similar with the radian of the outside edge of most steering wheels. This device will fit for mounting on different motor vehicles. The back half clamp 4 is connected with the support 3 by clamp axle 6. The top and bottom edges of the back half clamp 4 is designed to have a similar radian of the outside edge of a steering wheel, and the inner side of the back half clamp is also designed to have a similar radian of the ring of a steering wheel. With the force of the clamp spring 5, the device is rigidly mounted on a steering wheel. The device will not shift or move in any directions. Number 16 is a steering wheel in the support 3.

FIG. 5 shows a table in bottom side view. Number 25 is the reinforce ribs with same thickness to strengthen the table surface.

FIG. 5A shows a cup slot 2 in a sectional view. The depth of the slot is the same as the reinforce rib 25.

FIG. 6 shows that the table surface 1 may be constructed in a single part with the table angle control 9 in casting, in order that the table angle control 9 will move and push the table surface 1 up and down. Number 17 is a steering wheel in sectional view in the support 3.

FIGS. 7A to 7D show that the angle-adjusting wheel 11 and angle-control polygonal flange plate 12 are connected to each other and are constructed as one part in casting. The plate is an irregular polygon, could be (4 sided) irregular quadrilateral or (5 sided) irregular pentagon, depending on how many adjusting levels are desired. One more side will add one more different level.

FIG. 7E is an angle-adjusting wheel 11 in a sectional view, and FIG. 7F is an angle-adjusting wheel 11 in back view. FIGS. 7E and 7F show that the polygonal plate 12 has a square hole 29 in the middle in 2 mm deep, then changes into a round hole 29 all the way through. In corresponding to this specially designed hole, the angle-adjusting wheel axle 10 has the same characters and its bottom end 19 is square too. As forced down by the angle-adjusting wheel spring 13, the angle-adjusting wheel axle's square end 19 goes into the polygonal plate square hole 30. Thus, the angle-adjusting wheel 11 is locked and will not turn or rotate. The position of the angle-control polygonal flange plate 12 determines the position of the table angle control 9 and the angle of the table surface 1. Because the radius of the each side of the polygonal plate 12 to the middle point of the angle-adjusting wheel 11 is different.

FIG. 7G is an angle adjusting wheel axle 10 in a sectional view, showing that the axle is a cylinder with a square end.

Operation—FIG. 4, FIG. 6 and FIG. 7

FIG. 4, FIG. 6 and FIG. 7 illustrate an embodiment showing how the present invention works.

FIG. 4 and FIG. 6 show that the device mounted on a steering wheel with a clamp 4 and the support 3.

FIG. 7 shows a serial of positions of the angle-adjusting wheel and the different angles between the table surface 1 and the support 3.

If you need to change the table surface angle or level, simply pull up the angle-adjusting wheel 11 for about 3 mm and turn to a desired position. When the angle-adjusting wheel 11 is released, the wheel will go back down as forced by the angle control spring 13, and there will be a snap sound when flange point 20 on the table angle control 9 goes into a respective recess hole 21 in angle-adjusting wheel 11.

In the illustration of this invention, a 4-sided irregular quadrilateral is used for the angle-control polygonal flange plate 12. Every 90-degree is a position point for the table angle control 9. By turning the angle-adjusting wheel 11 to a different position, the radius of each side of the polygonal plate 12 to the middle point of the angle-adjusting wheel 11 is changed, which in turn changes the angle (position) of the table angle control 9 and eventually changes the angle between the table surface 1 and the support 3.

There is one angle-adjusting wheel 11 on each side of the support 3. It is necessary to adjust both wheels at the same time to the same position point. The position point on the wheel is indicated by numbers 1, 2, 3, 4, etc. For use on the same steering wheel, one time adjustment is enough.

Summary, Ramification, and Scope

Thus, the reader will see that the table of this invention can will be easily and rigidly mounted on a steering wheel, whether is has an air-bag or not, can be removed just as easily as mounted on, can be used for eating, writing, reading, even is rigid and stable enough for a lap-top computer, can be used as a cosmetic table, can adjust the angle of the table surface a steering wheel, no matter whether said steering wheel is adjustable or not, can be folded up flat for easy storage.

Although the description above contains many specifications, these should not be construed as limiting the scope of the invention but as merely providing illustrations of some of the presently preferred embodiments of this invention. For example, the polygonal shape of the flange plate can be in other shapes, such as irregular oval. Therefore, the scope of the invention should be determined by the appended claims and their legal equivalents, rather than by the examples given here either in writing or drawings.

I claim:

1. In a foldable steering wheel table for use in a motor vehicle, comprising:

a. A planar table surface;
   b. A pair of table angle controls at a bottom of two opposite sides of the table;
   c. An arch shape support, with a radian of its inner side wall very similar to that of a steering wheel, pivotally connects to the table surface;
   d. One or more clamps on the support; and
   e. A pair of angle-adjusting wheels, each pivotally connected to a respective lower side of said support, the pivots allowing the angle-adjusting wheels to rotate in order to adjust the level and angle of the table surface.
   f. A pair of table angle controls at the bottom of the table at each side, which forms a lever arm at each side of the table, which control and change the angle between the table surface and the support, wherein the angle control extends a length of arm of force from a table axle to an angle-control polygonal flange plate, which enables the table to sustain more weight.

2. In a folding steering wheel table for use in a motor vehicle, comprising an arch-shaped support, having a pair of angle-adjusting wheels, a pair of table angle controls which form a lever arm, each angle-adjusting wheel includes a pivot which is pivotally connected to a respective lower part of said support, the pivots allow the angle-adjusting wheels to rotate in order to adjust a level and angle of the table surface, wherein each wheel having an angle-control polygonal flange plate, each connected in casting to a respective angle-adjusting wheel as part of the wheel, said flange plate with a polygon shape having a different radius from a middle pivot hole to each side, such that by rotating the wheel with the flange plate, the position of the lever arm changes thereby changing the angle between the table surface and the support.

3. In a folding steering wheel table for use in a motor vehicle, comprising an arch-shaped support, having a pair of angle-adjusting wheels, a pair of angle controls which form a lever arm, each angle-adjusting wheel includes a pivot which is pivotally connected to a respective lower part of said support, the pivots allow the angle-adjusting wheels to rotate in order to adjust a level and angle of the table surface, wherein each wheel having an angle-control polygonal flange plate, each connected in casting to a respective angle-adjusting wheel as part of the wheel, said flange plate with an oval shape having a different radius from a middle pivot hole to each side, such that by rotating the wheel with the flange plate, the position of the lever arm changes thereby changing the angle between the table surface and the support.

* * * * *